United States Patent
Bronnikov et al.

(10) Patent No.: US 7,860,842 B2
(45) Date of Patent: Dec. 28, 2010

(54) MECHANISM TO DETECT AND ANALYZE SQL INJECTION THREATS

(75) Inventors: Dmitri Bronnikov, Foster City, CA (US); Charles Wetherell, Palo Alto, CA (US)

(73) Assignee: Oracle International Corporation, Redwood Shore, CA (US)

( * ) Notice: Subject to any disclaimer, the term of this patent is extended or adjusted under 35 U.S.C. 154(b) by 1114 days.

(21) Appl. No.: 11/082,280

(22) Filed: Mar. 16, 2005

(65) Prior Publication Data

US 2006/0212941 A1    Sep. 21, 2006

(51) Int. Cl.
G06F 7/00    (2006.01)
(52) U.S. Cl. .......... 707/690; 726/25
(58) Field of Classification Search .......... None
See application file for complete search history.

(56) References Cited

U.S. PATENT DOCUMENTS

| | | | | |
|---|---|---|---|---|
| 5,875,334 | A * | 2/1999 | Chow et al. | 717/141 |
| 5,987,455 | A * | 11/1999 | Cochrane et al. | 707/4 |
| 7,444,331 | B1 * | 10/2008 | Nachenberg et al. | 1/1 |
| 7,568,229 | B1 * | 7/2009 | Nachenberg et al. | 726/23 |
| 7,702,642 | B1 * | 4/2010 | Wolfman et al. | 707/999.101 |
| 2003/0093410 | A1 * | 5/2003 | Couch et al. | 707/3 |
| 2005/0027981 | A1 * | 2/2005 | Baum-Waidner et al. | 713/164 |
| 2005/0055565 | A1 * | 3/2005 | Fournet et al. | 713/200 |
| 2005/0203921 | A1 * | 9/2005 | Newman et al. | 707/100 |
| 2006/0004863 | A1 * | 1/2006 | Chan et al. | 707/104.1 |
| 2006/0031933 | A1 * | 2/2006 | Costa et al. | 726/22 |

OTHER PUBLICATIONS

SQLrand: Preventing SQL Injection Attacks, ACNS 2004, LNCS 3089, pp. 292-302, Boyd et al.*
A graphical data flow language for retrieval, analysis, and visualization of scientific database, Journal of visual languages and computing (1996) 7, pp. 247-265, Dogru et al.*
Architectures for intrusion tolerant database system, Proceedings of the 18th annual computer security application conference (ACSAC'02), Liu.*
Static Checking of dynamically generated queries in database applications, Proceedings of the 26th International Conference on Software Engineering (ICSE'04), Gould et al.*
A dataflow database machine, Lubomir et al, ACM Transactionson Database Systems, vol. 14, No. 1, Mar. 1989, pp. 114-146.*
SQL rand: Preventing SQL injection attacks, Boyd et al, ACNS 2004, LNCS 3089, pp. 292-302, 2004.*
Huang, Y. et al., "Securing Web Application Code by Static Analysis and Runtime Protection" *WWW* (2004) pp. 40-52.
Wasserman, G. et al. "Sound and Precise Analysis of Web Applications for Injection Vulnerabilities" (Jun. 2007) *ACM*, 10 pages.

* cited by examiner

*Primary Examiner*—Pierre M Vital
*Assistant Examiner*—Augustine Obisesan
(74) *Attorney, Agent, or Firm*—Hickman Palermo Truong & Becker LLP

(57) ABSTRACT

A vulnerability analysis tool is provided for identifying SQL injection threats. The tool is able to take advantage of the fact that the code for many database applications is located in modules stored within a database. The tool constructs a data flow graph based on all, or a specified subset, of the application code within the database. The tool identifies, within the data flow graph, the nodes that represent values used to construct SQL commands. Paths to those nodes are analyzed to determine whether any SQL injection threats exist.

36 Claims, 3 Drawing Sheets

DEPENDENCY GRAPH 100

MECHANISM TO DETECT AND ANALYZE SQL INJECTION THREATS

FIELD OF THE INVENTION

The present invention relates to database systems and, more specifically, to detecting and analyzing SQL injection threats within a database application.

BACKGROUND

Database applications interact with a database server by sending to the database server commands that conform to a language supported by the database server. The Structured Query Language (SQL) is a popular language supported by many database servers. The commands sent by database applications to database servers that support SQL are referred to herein as SQL commands.

SQL may be used to specify a wide variety of operations, including operations that could compromise the integrity of the database against which the operations are performed. Therefore, it is important for database application developers to design database applications in a manner that does not allow users of their applications to request operations that the application developers do not intend.

Under certain conditions, a database application may send to a database server a SQL command that requests an operation that the application was not designed to request. This scenario may occur, for example, if some or all of the text of the SQL command sent by the application is the result of a "SQL injection".

A "SQL injection" is the input and eventual execution of a syntactically meaningful fragment of SQL through an ordinary user data entry mechanism. Commonly, the term "SQL injection" is reserved for such inputs which are not anticipated by the application developers to be SQL fragments.

A "SQL injection threat" is a SQL injection that acquires access to the database and its facilities, which access was not intended to be granted. Such an injection is a "threat" because the unintended access can be used to damage or subvert the database. A SQL injection may be benign, understood, and intended by the application designer or "malignant" in the sense that the application designer did not intend for the injection to exist.

In many situations, SQL injection threats exist because application developers do not realize that a particular portion of their application is vulnerable. A portion of an application that is vulnerable to SQL injection is referred to herein as a "vulnerable site". Due to the potential damage that may result from a SQL injection, it is desirable to provide a mechanism that detects and identifies vulnerable sites within database applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
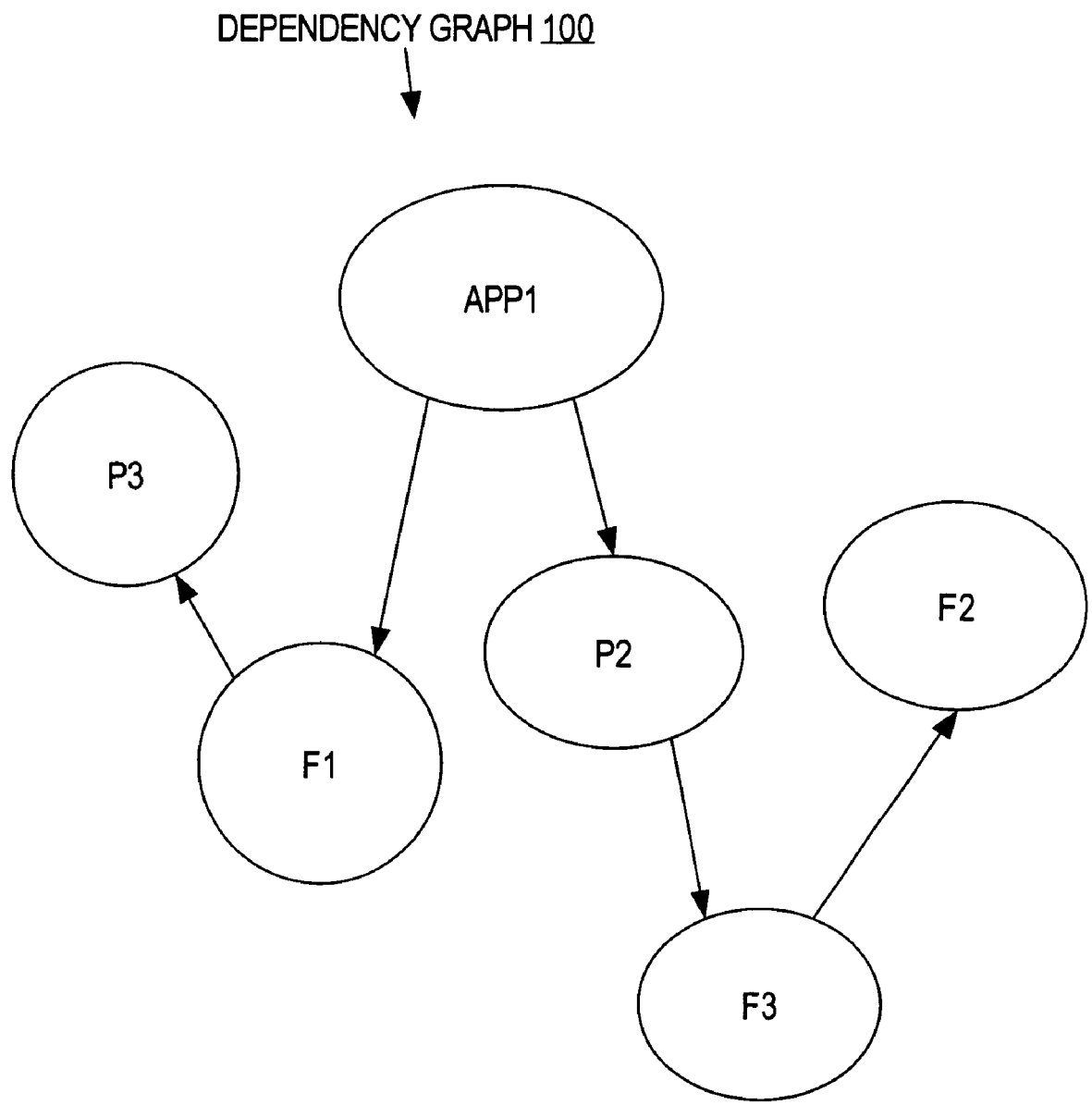
FIG. 1 is a block diagram of a dependency graph, which may be used by a vulnerability analysis tool to detect SQL injection threats, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A vulnerability analysis tool is provided for identifying SQL injection threats. In one embodiment, the tool takes advantage of the fact that the code for many database applications is located in modules stored within a database. The tool constructs a data flow graph based on all, or a specified subset, of the application code within the database. The tool identifies, within the data flow graph, the nodes that represent values used to construct SQL commands. Paths to those nodes are analyzed to determine whether any SQL injection threats exist.

As mentioned above, a SQL injection threat occurs, for example, when a SQL command issued by an application includes unintended text, such as text entered by a user through the application's user interface. Consequently, applications which concatenate values entered by the user with other SQL statement text to generate a final executable statement are vulnerable to SQL injection threats.

If the vulnerable sites within an application can be found and isolated, local changes are often enough to immunize an application against SQL injection threats. For example, to prevent SQL injection threats represented by text concatenation, the SQL binding mechanism may be used in place of text concatenation to form the desired SQL command.

Techniques are provided for finding and reporting vulnerable sites within applications. According to one embodiment, the vulnerable sites of an application are found by locating the paths, through the application, down which data can flow (1) from a data entry point (2) to the construction and execution of a SQL statement. Upon detecting such a path, the path may then be reported to the application developers for analysis and cleanup of any SQL injection threats.

According to one embodiment, the vulnerability analysis tool takes advantage of the fact that the source code of the application is in a database. Consequently, the metadata maintained by the database, and the capabilities of the database server that manages the database, may be employed in the process of detecting vulnerable sites within the application.

Stored Procedures

A stored procedure is a software module whose code is stored within a database. Many database applications, or portions thereof, are implemented as stored procedures.

Specifically, many database systems support programming languages, and allow code modules written in those programming languages to be stored within the database. Application developers take advantage of the server-support of those programming languages by designing database applications as stored procedures.

PL/SQL is an example of a programming language that is supported by some database systems. When a database application is written in PL/SQL, the modules of the application are typically stored within a database. When routines within those modules are called, the routines are executed within the database server that manages the database in which the modules are stored.

Typically, database systems support interpreted languages. Thus, stored procedures are usually stored in the form of source code, rather than compiled machine-executable code. Consequently, when a routine within one of the stored procedures is called, the source code that defines the routine is passed to a server-implemented interpreter. The interpreter parses and interprets the source code, and then executes the operations specified therein. Such operations may involve, for example, submitting a SQL command to a SQL engine within the same database server that is executing the stored procedure.

Dependency Models

When an application is implemented using stored procedures, the source code of the stored procedures is stored within a database. In addition, the database typically stores metadata that represents a dependency model that reflects the dependencies between the modules that contain the stored procedures. For example, the dependency model indicates, for the routines defined in the stored procedures, which routines call which other routines.

FIG. 1 is a block diagram that illustrates a dependency graph 100 that illustrates the relationships, between modules, that are indicated in a dependency model. Specifically, dependency graph 100 illustrates that application APP1 includes code that calls function F1 and procedure P2. Procedure P2 includes code that calls function F3. Function F3 includes code that calls function F2. Function F1 includes code that calls procedure P3.

According to one embodiment, the dependency model metadata is used by the vulnerability analysis tool during the construction of a data flow graph. The data flow graph, in turn, is used in the vulnerability analysis operation to detect SQL injection threats. The construction of data flow graphs, and the use of such graphs to detect SQL injection threats, shall be described in greater detail below.

Data Flow Graphs

A data flow graph is a graph in which nodes represent value-holders. A value-holder may be any construct, symbolically represented in the code of an application, capable of holding a value. For example, the variables and formal parameters defined within an application are value-holders that may be represented as nodes within a data flow graph.

The edges in a data flow graph are directed, and reflect which value-holders within an application influence which other value-holders. Specifically, a data flow graph for an application has an edge from a first node to a second node if the logic of the application is such that the value of the value-holder represented by the first node is able to affect the value of the value-holder represented by the second node.

Figure 2:
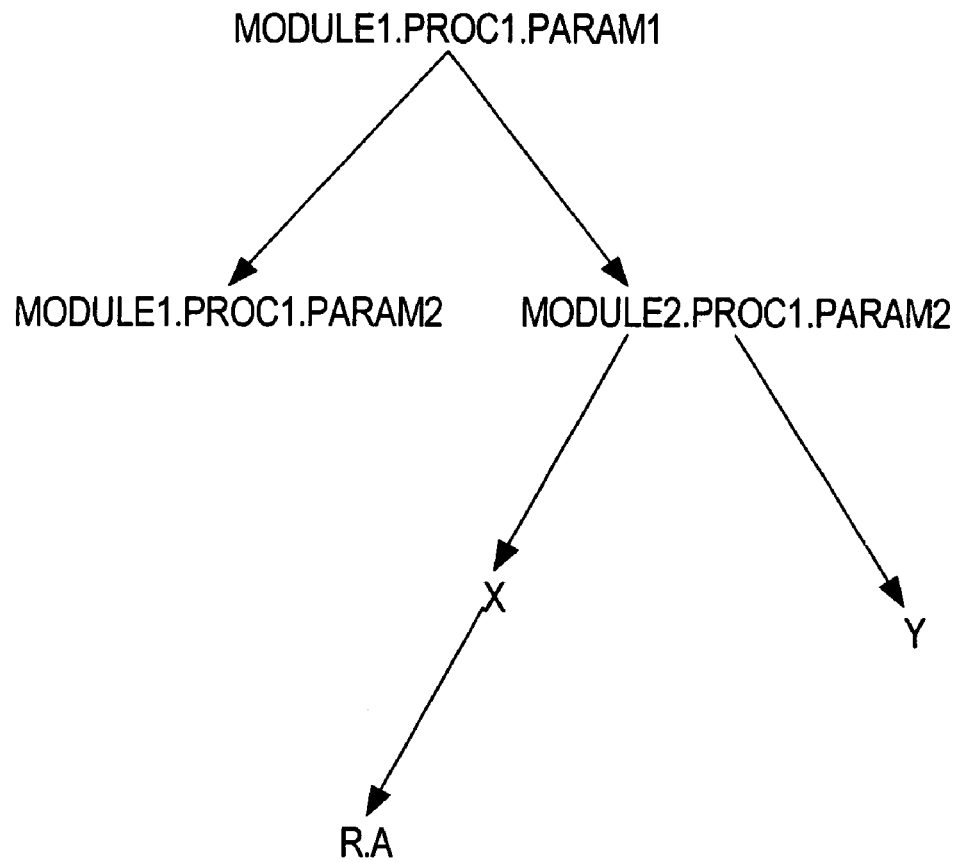
FIG. 2 is a block diagram of a data flow graph which may be used by a vulnerability analysis tool to detect SQL injection threats, according to an embodiment of the invention.

FIG. 2 is a block diagram that illustrates a data flow graph 200 according to an embodiment of the invention. Several value-holders are represented in data flow graph 200, including module1.proc1.param1, module1.proc1.param2, module2.proc1.param2, x, y, and r.a. The edges indicate that the application includes statements in which the value of module1.proc1.param1 influences the values of module.proc1.param2 and module2.proc1.param2. The edges also indicate that the application includes statements in which the value of module2.proc1.param2 influences the values of x and y. In addition, data flow graph 200 includes an edge that indicates that the application has statements in which the value of x influences the value of r.a.

Statements in which one value-holder influences another value-holder may take many forms. For example, the edge, within data flow graph 200, between module2.proc1.param2 and x may be the result of an assignment statement, such as "x:=param2||q", within proc2 of module2. On the other hand, the edge, within data flow graph 200, between x and r.a may be the result of a function call, such as "call r(x)", where the formal parameter of function r( ) is "a".

According to one embodiment, detecting vulnerable sites within an application involves building a data flow graph for the application, and identifying vulnerable sites based on the data flow graph. Any one of a variety of techniques may be used to construct the data flow graph for the application. Several such techniques are described, for example, in Muchnick, Steven S. "Advanced Compiler Design and Implementation". Morgan Kaufmann Publishers, San Francisco. 1997. See, in particular, Chapter 19, "Interprocedural Analysis and Optimization". The present invention is not limited to any particular technique for constructing a data flow graph.

As mentioned above, the dependency model metadata within a database may be used to facilitate the construction of the data flow graph. For example, there can only be a dataflow relationship between value-holders defined in two modules if there is a dependency between the two modules. Consequently, the dependency model metadata may be used during a vulnerability analysis operation to determine which modules need to be inspected to construct the data flow graph.

For example, assume that a database contains three modules A, B, and C. Assume further that a particular application APP1 uses stored procedures defined in module A. If the dependency model metadata indicates a dependency between A and B, but no dependencies between A and C or B and C, then C need not be inspected to construct the data flow graph for a vulnerability analysis of application APP1.

During a vulnerability analysis of an application, a data flow graph is constructed for the value-holders within the application. Once constructed, the data flow graph is used to identify vulnerable sites within the application. In the context of SQL injection, a vulnerable site may be indicated by a path, within the data flow graph, that connects a user input node to a command construction node. User input nodes and command construction nodes shall be described in greater detail hereafter.

User Input Nodes

An "input value-holder" is a value-holder which, during the execution of an application, may be assigned a value specified by user input. The nodes, within a data flow graph, that correspond to input value-holders are referred to herein as "user input nodes".

As mentioned above, sites that are vulnerable to SQL injection threats may be indicated by a path, within the data flow graph of an application, that flows from a user input node to a command construction node. To identify paths that satisfy these conditions, it is necessary to be able to determine which nodes are user input nodes and which nodes are command construction nodes.

According to one embodiment, the user input nodes are identified by the user of the vulnerability analysis tool. Specifically, prior to performing a vulnerability analysis operation on a particular database application, a user identifies which value-holders within the database application, have values set by user input. According to one embodiment, data that identifies the user input nodes is persistently stored so that in subsequent vulnerability analysis operations performed on the same database application, the user need not enter the same information.

According to another embodiment, the vulnerability analysis tool includes logic for identifying, within the code of an application, statements in which value-holders are assigned values from user input. In such an embodiment, the nodes associated with the value-holders that are assigned values from user input are automatically identified to be user input nodes.

According to another embodiment, the input value-holders are neither identified by the user, nor automatically identified by the vulnerability analysis tool. In such an embodiment, because the input value-holders are unknown, all nodes are treated as potential user input nodes. Under these circumstances, the vulnerability analysis tool may provide output that indicates all value-holders, within the application, that are associated with nodes that have paths that lead to command construction nodes. Based on such output and the user's own knowledge about the application, the user may determine which, if any, of the value-holders thus identified represent vulnerable sites.

Command Construction Nodes

A command construction node is a node, within the data flow graph, that corresponds to a value-holder whose value is used by the database application to construct a database command. For example, assume that the database application includes the following statements:

x:='select'||y;
execute x;

In this example, the "execute x" statement within the database application causes the database application to submit to the database server a SQL command, where the text of the SQL command is the value of the variable x. Thus, variable x is a value-holder used by the database application to construct a SQL command. Because of the assignment statement "x:='select'||y;", the value of x is influenced by the value of y. Therefore, the data flow graph for the application would include an edge from the node for x to the node for y.

According to one embodiment, the vulnerability analysis tool includes logic for identifying, within the source code of a database application, those statements in which a value-holder is used by the database application to construct a database command. Based on those statements, the vulnerability analysis tool is able to automatically identify which nodes, within the data flow graph of the application, qualify as command construction nodes.

Vulnerable Command Construction Nodes

Not all paths that lead from user input nodes to command construction nodes represent injection threats. For example, when the value of a value-holder is passed to a SQL command using a bind variable, the value of the value-holder cannot alter the SQL command in an unanticipated way. Command construction nodes that correspond to value-holders used in such construction operations are referred to herein as "safe command construction nodes".

On the other hand, when a SQL command is constructed in other ways, such as by a concatenation operation involving a value-holder, the SQL command is vulnerable to unintended alteration. Command construction nodes that correspond to value-holders used in such construction operations are referred to herein as "vulnerable command construction nodes". Thus, based on the statements:

x:='select'||y;
execute x;

the node associated with variable x would be identified as a vulnerable command construction node.

Threat Paths

A path, within the data flow graph of an application, that leads from a user input node to a vulnerable command construction node is referred to herein as a "threat path". The portion of a database application that involves a value-holder represented at the head of a threat path is considered a "vulnerable site" for SQL injection.

In embodiments where the vulnerability analysis tool knows which value-holders are input value holders, the vulnerability analysis tool may generate output that identifies the vulnerable sites and/or indicates the threat paths within a database application. According to one embodiment, the process of identifying the threat paths within an application includes:

(1) inspecting the dependency model metadata to determine which modules need to be inspected to construct the data flow graph for the application;

(2) inspecting the statements within the selected modules to determine the data flow between value-holders within the application;

(3) constructing the data flow graph for the application;

(4) identifying the user input nodes in the data flow graph;

(5) identifying the vulnerable command construction nodes in the data flow graph; and (6) identifying paths, within the data flow graph, between the user input nodes and the vulnerable command construction nodes.

In embodiments where the vulnerability analysis tool does not know which value-holders are input value holders, the vulnerability analysis tool may assume that all value-holders are potential input value-holders, and use the same steps enumerated above to generate output that identifies the potential vulnerable sites and/or indicates the potential threat paths within a database application. Under these conditions, the database developer may inspect the output and, based on the developer's knowledge about which value-holders are in fact input value-holders, determine which of the potential threat paths identified in the output are actual threat paths.

Sanitized Nodes

As used herein, the term "sanitization code" refers to code that ensures that a value-holder will not hold a value that poses a threat. If an application includes sanitization code for a value-holder, then the node for that value holder, within the data flow graph of the application, is considered a "sanitized node". Paths through a sanitized node are not considered threat paths, even if the paths would otherwise qualify as a threat path.

According to one embodiment, the vulnerability analysis tool automatically identifies sanitization code when scanning the code of an application to construct the data flow graph for the application. A variety of techniques may be used to provide and detect sanitation code. For example, in one embodiment, a particular routine containing sanitization code is provided to the application developer. To sanitize the value of a value-holder, the application developer includes, within the code of the application, a statement that calls the provided routine. The vulnerability analysis tool detects sanitization code by looking for statements, within the application code, that make calls to the provided routine.

Instead or, or in addition to, using a provided routine to sanitize the value of value-holders, application developers may write their own sanitization code. According to one embodiment, developer-written sanitization code is identified by the application developer with a tag. The tag may take on any form. For example, the application developer may insert a particular text string or symbol in the application code to tag the sanitization code. Alternatively, the vulnerability analysis tool may include a mechanism that allows the user of the tool to tag certain statements and/or sections of the application code.

User-Specified Scope of Vulnerability Analysis

According to one embodiment, the vulnerability analysis tool includes a mechanism by which a user may specify the scope of each vulnerability analysis operation. For example, a database may include stored procedures for several applications. In one embodiment, the user is able to specify (1) which applications stored within the database will be considered during the vulnerability analysis, (2) which modules within those applications will be considered during the vulnerability analysis. Once the user has specified the scope of the vulnerability analysis, the data flow graph used to identify threat paths is constructed based only on the value-holders referred to in the specified modules of the specified applications.

According to one embodiment, when a user identifies specific modules for a vulnerability analysis operation, the vulnerability analysis tool uses the dependency model maintained by the database to determine which additional modules, if any, need to be analyzed during the operation. For example, if the user requests a vulnerability analysis of module A, the vulnerability analysis tool may determine that modules C and X also need to be examined, if the dependency model indicates that A depends on C, and C depends on X.

Stored Vulnerability Results

According to one embodiment, the results of a vulnerability analysis operation are stored within the database. After the results of a vulnerability analysis operation has been stored, subsequent incremental vulnerability analysis operations may be performed. During a subsequent incremental vulnerability analysis operation, only those portions of code that (1) have changed since the prior operation, or (2) were not within the scope of any prior operation, have to be analyzed.

The dependency model of the database may be used to determine which portions of application code need to be analyzed during an incremental analysis operation. Specifically, the dependency model indicates when changes have occurred to each of the various modules of an application. Based on the change information indicated in the dependency model, the vulnerability analysis tool determines which modules have to be revisited during an incremental vulnerability analysis operation.

According to one embodiment, the stored vulnerability results may also be used by a separate reporting tool. The reporting tool generates reports based on the stored results of prior vulnerability analysis operations. According to one embodiment, the reporting tool includes an interface that allows the user to specify the scope of a report. The scope of a report may differ from the scope of the analysis operations whose stored data will be used by the report. For example, a vulnerability analysis operation may be performed for all code of all applications within a database. After the results of that operation are stored within the database, the reporting tool may be used to generate a report that indicates only the vulnerable sites in a particular module of a particular application.

User-Specified Analysis Barriers

According to one embodiment, the vulnerability analysis tool provides a mechanism by which a user may indicate locations, within the code of an application, that serve as "barriers" for vulnerability analysis operations. All of the code that appears after such user-specified barriers is ignored for the purpose of constructing the data flow graph used in a vulnerability analysis operation.

For example, a user may specify a stop point in the middle of a routine. If X is assigned Y before the stop point in the routine, then the data flow graph will have an edge from a node representing X to a node representing Y. On the other hand, if X is assigned to Y after the stop point in the routine, then the data flow graph will not have an edge from the node representing X to the node representing Y, since the construction of the data flow graph does not take into account the code that follows the user-specified stop point.

The user may specify such barriers if, for example, the user is confident that the code that will be ignored does not pose a threat. Because large sections of an application may be excluded from the analysis by such barriers, the analysis operation will require less time and computation resources.

Offline Analysis

During a vulnerability analysis operation, the vulnerability analysis tool reads from the database the code of the one or more database applications involved in the vulnerability analysis operation. The vulnerability analysis tool may read the original code directly from the database in which the code resides (the "development database"), or may read a copy of the code that resides in a different database (a "working database"). For example, a snapshot of the development database may be stored in the working database.

The snapshot need not contain all of the data from the development database. Rather, the snapshot need only include the code of the applications involved in the analysis, and the corresponding metadata. The vulnerability analysis operation may then be performed based on the information contained in the snapshot, thereby reducing the impact that the analysis operation might have on operations being performed against the development database.

Database-Stored Code Analysis

In the embodiments discussed above, various techniques are provided for identifying SQL injection threats within applications whose code is stored within a database. However, in alternative embodiments, analysis operations may be performed for other purposes. For example, a tool may be provided for analyzing how many calls an application makes to a particular routine, or how often a particular type of statement is used. The scope of the present invention encompasses any such analysis tool that takes advantage of the fact that the source code of the application being analyzed is stored within a database.

As described above with respect to a tool that detects SQL injection threats, any such database-stored code analysis tool may make use of the dependency model metadata to determine the dependencies between stored code modules. Such dependency information may be used, for example, to determine which code modules need to be analyzed for a particular code analysis operation.

Further, database-stored code analysis tools do not require the user to provide or expressly identify source code files to the tool, as is necessary for conventional code analysis tools. Consequently, the tool is able to use the dependency model metadata to ensure that all of the code modules needed for any particular analysis operation are analyzed.

Hardware Overview

Figure 3:
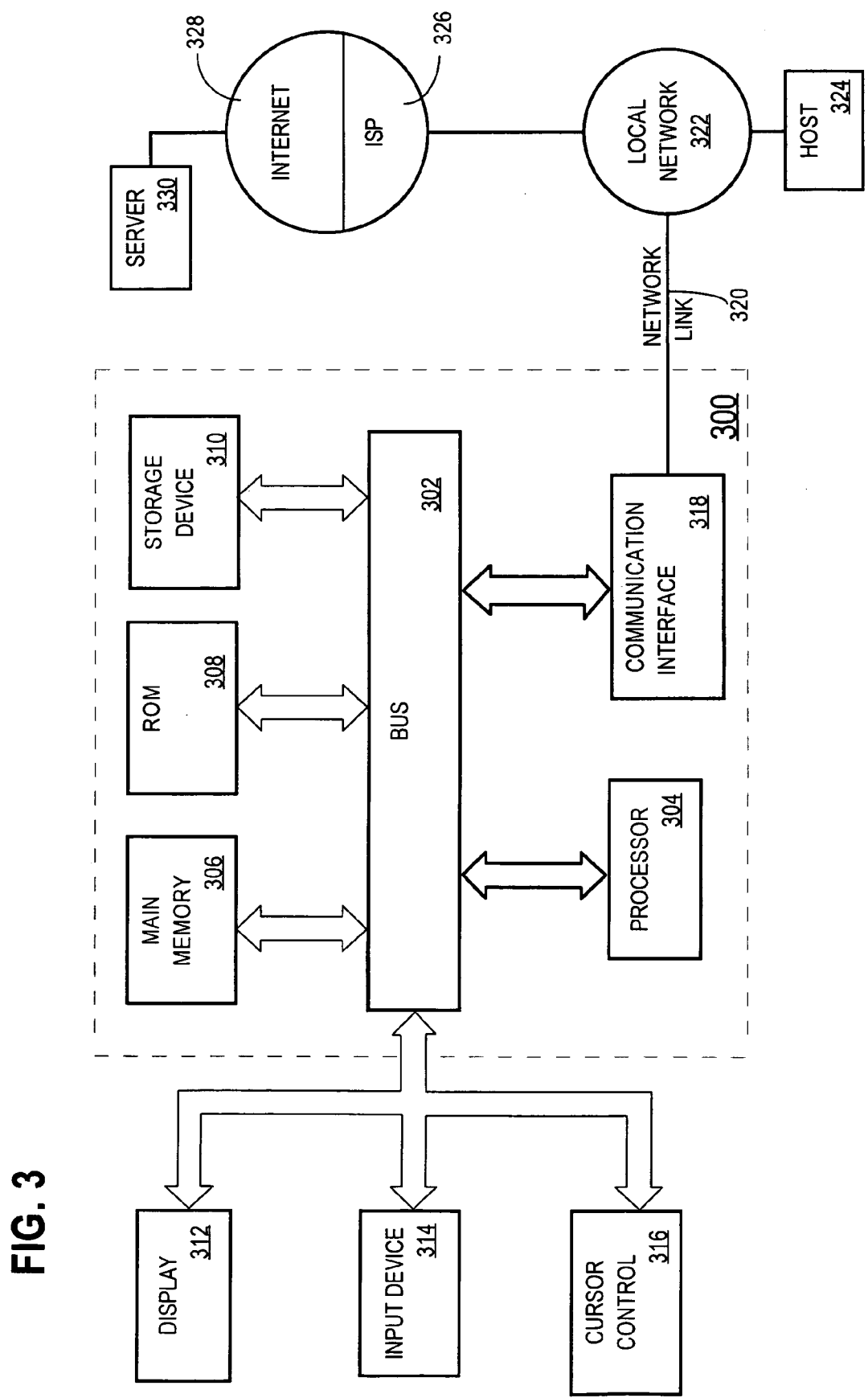
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for detecting vulnerable sites vulnerable to injection threats within code of a database application, the method comprising steps of:
   constructing, within a memory of a computer system, a data flow graph, having nodes corresponding to value-holders, that reflects data flow between value-holders, wherein each of said value-holders comprises code that symbolically represents a construct capable of holding a value;
   automatically identifying, in the data flow graph, a set of command-formation nodes, that correspond to value-holders whose values are used to form database commands that the database application may submit to a database when the database application is executed;
   detecting the vulnerable sites vulnerable to injection threats based on whether, within the data flow graph, paths exist from user input nodes to the identified set of command-formation nodes;
   wherein user input nodes are nodes that correspond to value-holders whose values reflect user input that may be entered into the database application when the database application is executed;
   generating output identifying the vulnerable sites; and
   wherein the steps are performed by one or more computing devices.

2. The method of claim 1 further comprising determining which of the command-formation nodes are vulnerable to injection threats by determining which of the command-formation nodes are associated with value holders whose values are reflected in a constructed database command.

3. The method of claim 1 wherein the step of automatically identifying a set of command-formation nodes includes identifying a set of command-formation nodes that correspond to value-holders whose values are used to form Structured Query Language (SQL) commands.

4. The method of claim 1 wherein:
   the database stores a plurality of code modules;
   the data flow graph is based on value-holders in a subset of the code modules;
   the method further comprises:
      reading dependency model metadata from the database; and
      automatically determining which code modules, of the plurality of code modules, are included in the subset based on the dependency model metadata.

5. The method of claim 4 wherein:
   the method further comprises receiving user input that specifies a particular set of code modules; and
   the subset of code modules is determined based on the particular set of code modules and dependencies represented in the dependency model metadata.

6. The method of claim 1 wherein:
   the database application is implemented as a plurality of code modules stored in the database; and
   the data flow graph is constructed based on statements in said plurality of code modules.

7. The method of claim 6 wherein the plurality of code modules include one or more Procedural Language/Structured Query Language (PL/SQL) stored procedures.

8. The method of claim 1 further comprising:
   identifying sanitization code in the database application; and
   based on the identified sanitization code, identifying sanitized nodes within the data flow graph;
   wherein the step of generating output includes generating output that is based, at least in part, on nodes within the data flow graph that were identified as sanitized nodes.

9. The method of claim 8 wherein the step of identifying sanitization code is performed by detecting statements, within the database application, that call a particular routine.

10. The method of claim 8 wherein the step of identifying sanitization code is performed by detecting tags associated with particular code within the database application.

11. The method of claim 1 wherein:
   the method includes receiving user input that specifies a scope of a vulnerability analysis operation; and
   said data flow graph is constructed based only on application code associated with a specified scope.

12. The method of claim 11 wherein the specified scope includes a plurality of applications that are implemented by code stored in the database.

13. The method of claim 11 wherein the specified scope includes only a subset of said plurality of applications.

14. The method of claim 1 further comprising storing said output, in the database, as results of a first vulnerability analysis operation.

15. The method of claim 14 further comprising performing a second vulnerability analysis operation based, in part, on the results of the first vulnerability analysis operation.

16. The method of claim 14 further comprising performing an incremental vulnerability analysis operation based on which portions of the database application have changed since performance of the first vulnerability operation.

17. The method of claim 16 further comprising determining which portions of the database application to include in the incremental vulnerability analysis operation based on dependency model metadata stored within the database.

18. The method of claim 1 wherein:
   the database application includes a user-specified analysis barrier; and
   the data flow graph does not account for code that exists beyond the user-specified analysis barrier.

19. The method of claim 1 wherein:
the method includes making a snapshot of a database, wherein the snapshot includes code modules of the database application but does not include user data from the database; and
the step of constructing the data flow graph is performed based on information retrieved from said snapshot.

20. A computer-readable non-transitory storage medium storing one or more sequences of instructions which, when executed by one or more processors, cause the one or more processors to perform the steps of:
constructing, within a memory of a computer system, a data flow graph, having nodes corresponding to value-holders, that reflects data flow between value-holders, wherein each of said value-holders comprises code that symbolically represents a construct capable of holding a value;
automatically identifying, in the data flow graph, a set of command-formation nodes, that correspond to value-holders whose values are used to form database commands that a database application may submit to a database when the database application is executed;
detecting vulnerable sites vulnerable to injection threats based on whether, within the data flow graph, paths exist from user input nodes to the identified set of command-formation nodes;
wherein user input nodes are nodes that correspond to value-holders whose values reflect user input that may be entered into the database application when the database application is executed;
generating output identifying the vulnerable sites.

21. The computer-readable storage medium of claim 20, wherein the one or more sequences of instructions which, when executed by one or more processors, further cause the one or more processors to perform: determining which of the command-formation nodes are vulnerable to injection threats by determining which of the command-formation nodes are associated with value holders whose values are reflected in a constructed database command.

22. The computer-readable storage medium of claim 20, wherein the instructions that cause the automatically identifying a set of command-formation nodes further comprise instructions which, when executed, cause identifying a set of command-formation nodes that correspond to value-holders whose values are used to form Structured Query Language (SQL) commands.

23. The computer-readable storage medium of claim 20, wherein the one or more sequences of instructions which, when executed by the one or more processors, further cause the one or more processors to perform:
reading dependency model metadata from the database;
automatically determining which code modules, of a plurality of code modules, are included in a subset based on the dependency model metadata;
wherein the database stores the plurality of code modules; and
wherein the data flow graph is based on value-holders in the subset of the code modules.

24. The computer-readable storage medium of claim 23, wherein the one or more sequences of instructions which, when executed by the one or more processors, further cause the one or more processors to perform:
receiving user input that specifies a particular set of code modules;
wherein the subset of code modules is determined based on the particular set of code modules and dependencies represented in the dependency model metadata.

25. The computer-readable storage medium of claim 20, wherein:
the database application is implemented as a plurality of code modules stored in the database; and
the data flow graph is constructed based on statements in said plurality of code modules.

26. The computer-readable storage medium of claim 25, wherein the plurality of code modules include one or more Procedural Language/Structured Query Language (PL/SQL) stored procedures.

27. The computer-readable storage medium of claim 20, wherein the one or more sequences of instructions which, when executed by the one or more processors, further cause the one or more processors to perform:
identifying sanitization code in the database application; and
based on the identified sanitization code, identifying sanitized nodes within the data flow graph;
wherein the generating output further comprises generating output that is based, at least in part, on nodes within the data flow graph that were identified as sanitized nodes.

28. The computer-readable storage medium of claim 27, wherein the instructions that cause the identifying sanitization code further comprise instructions which, when executed, cause detecting statements, within the database application, that call a particular routine.

29. The computer-readable storage medium of claim 27, wherein the instructions that cause the identifying sanitization code further comprise instructions which, when executed, cause detecting tags associated with particular code within the database application.

30. The computer-readable storage medium of claim 20, wherein the one or more sequences of instructions which, when executed by the one or more processors, further cause the one or more processors to perform:
receiving user input that specifies a scope of a vulnerability analysis operation;
wherein said data flow graph is constructed based only on application code associated with said specified scope.

31. The computer-readable storage medium of claim 20, wherein the one or more sequences of instructions which, when executed by the one or more processors, further cause the one or more processors to perform: storing said output, in the database, as results of a first vulnerability analysis operation.

32. The computer-readable storage medium of claim 31, wherein the one or more sequences of instructions which, when executed by the one or more processors, further cause the one or more processors to perform: performing a second vulnerability analysis operation based, in part, on the results of the first vulnerability analysis operation.

33. The computer-readable storage medium of claim 31, wherein the one or more sequences of instructions which, when executed by the one or more processors, further cause the one or more processors to perform: performing an incremental vulnerability analysis operation based on which portions of the database application have changed since performance of the first vulnerability operation.

34. The computer-readable storage medium of claim 33, wherein the one or more sequences of instructions which, when executed by the one or more processors, further cause the one or more processors to perform: comprising determining which portions of the database application to include in the incremental vulnerability analysis operation based on dependency model metadata stored within the database.

35. The non-transitory computer-readable storage medium of claim 20, wherein: the database application includes a user-specified analysis barrier;
and the data flow graph does not account for code that exists beyond the user-specified analysis barrier.

36. The computer-readable storage medium of claim 20, wherein the one or more sequences of instructions which, when executed by the one or more processors, further cause the one or more processors to perform:

making a snapshot of data stored in the database, wherein the snapshot includes code modules of the database application but does not include user data from the database;

wherein the constructing the data flow graph is performed based on information retrieved from said snapshot.

* * * * *

UNITED STATES PATENT AND TRADEMARK OFFICE
CERTIFICATE OF CORRECTION

| | | |
|---|---|---|
| PATENT NO. | : 7,860,842 B2 | Page 1 of 1 |
| APPLICATION NO. | : 11/082280 | |
| DATED | : December 28, 2010 | |
| INVENTOR(S) | : Dmitri Bronnikov et al. | |

It is certified that error appears in the above-identified patent and that said Letters Patent is hereby corrected as shown below:

On the title page, item (56), in column 2, under "Other Publications", line 1, delete "SQLrand:" and insert -- SQL rand: --, therefor.

On the title page, item (56), in column 2, under "Other Publications", line 12, delete "Transactionson" and insert -- Transactions on --, therefor.

In column 14, line 9, in claim 26, delete "Ouery" and insert -- Query --, therefor.

In column 15, line 1-5,
delete "35. The non-transitory computer-readable storage medium of claim 20, wherein: the database application includes a user-specified analysis barrier;

and the data flow graph does not account for code that exists beyond the user-specified analysis barrier." and insert -- 35. The computer-readable storage medium of claim 20, wherein: the database application includes a user-specified analysis barrier; and the data flow graph does not account for code that exists beyond the user-specified analysis barrier. --, therefor.

Signed and Sealed this

Thirteenth Day of September, 2011

David J. Kappos
*Director of the United States Patent and Trademark Office*